United States Patent
Sakuma

(10) Patent No.: US 12,198,478 B2
(45) Date of Patent: Jan. 14, 2025

(54) INFORMATION PROCESSING APPARATUS, INFORMATION PROCESSING METHOD, AND TELEMATICS TERMINAL

(71) Applicant: TOYOTA JIDOSHA KABUSHIKI KAISHA, Toyota (JP)

(72) Inventor: Satoru Sakuma, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 326 days.

(21) Appl. No.: 17/828,619

(22) Filed: May 31, 2022

(65) Prior Publication Data

US 2022/0406099 A1    Dec. 22, 2022

(30) Foreign Application Priority Data

Jun. 16, 2021 (JP) ................. 2021-100454

(51) Int. Cl.
  *G07C 5/00* (2006.01)
  *B60W 40/08* (2012.01)
  *G07C 5/08* (2006.01)

(52) U.S. Cl.
  CPC ............ *G07C 5/008* (2013.01); *B60W 40/08* (2013.01); *G07C 5/0816* (2013.01); *G07C 5/085* (2013.01); *B60W 2540/043* (2020.02)

(58) Field of Classification Search
  None
  See application file for complete search history.

(56) References Cited

U.S. PATENT DOCUMENTS

| 2008/0214165 A1 | 9/2008 | Matsumura et al. |
| 2018/0174376 A1* | 6/2018 | Avary ............... G07C 5/008 |
| 2021/0039596 A1* | 2/2021 | Park ............... B60R 25/23 |

FOREIGN PATENT DOCUMENTS

| JP | 2007-265223 A | 10/2007 |
| JP | 2017-226399 A | 12/2017 |
| WO | 2006/134799 A1 | 12/2006 |

OTHER PUBLICATIONS

Machine Translation of JP 2007265223 A, Taki et al (Year: 2007).*

* cited by examiner

*Primary Examiner* — James J Lee
*Assistant Examiner* — David Hatch
(74) *Attorney, Agent, or Firm* — Oliff PLC

(57) ABSTRACT

An information processing apparatus receives an activation information from a telematics terminal mounted on a vehicle which is associated with a telematics service contract user. When the information processing apparatus receives the activation information, the information processing apparatus determines whether a predetermined condition is met. If it is determined that the predetermined condition is met, the information processing apparatus transmits a first instruction which causes an information regarding the contract user to be displayed to the telematics terminal.

4 Claims, 12 Drawing Sheets

[Fig. 1]
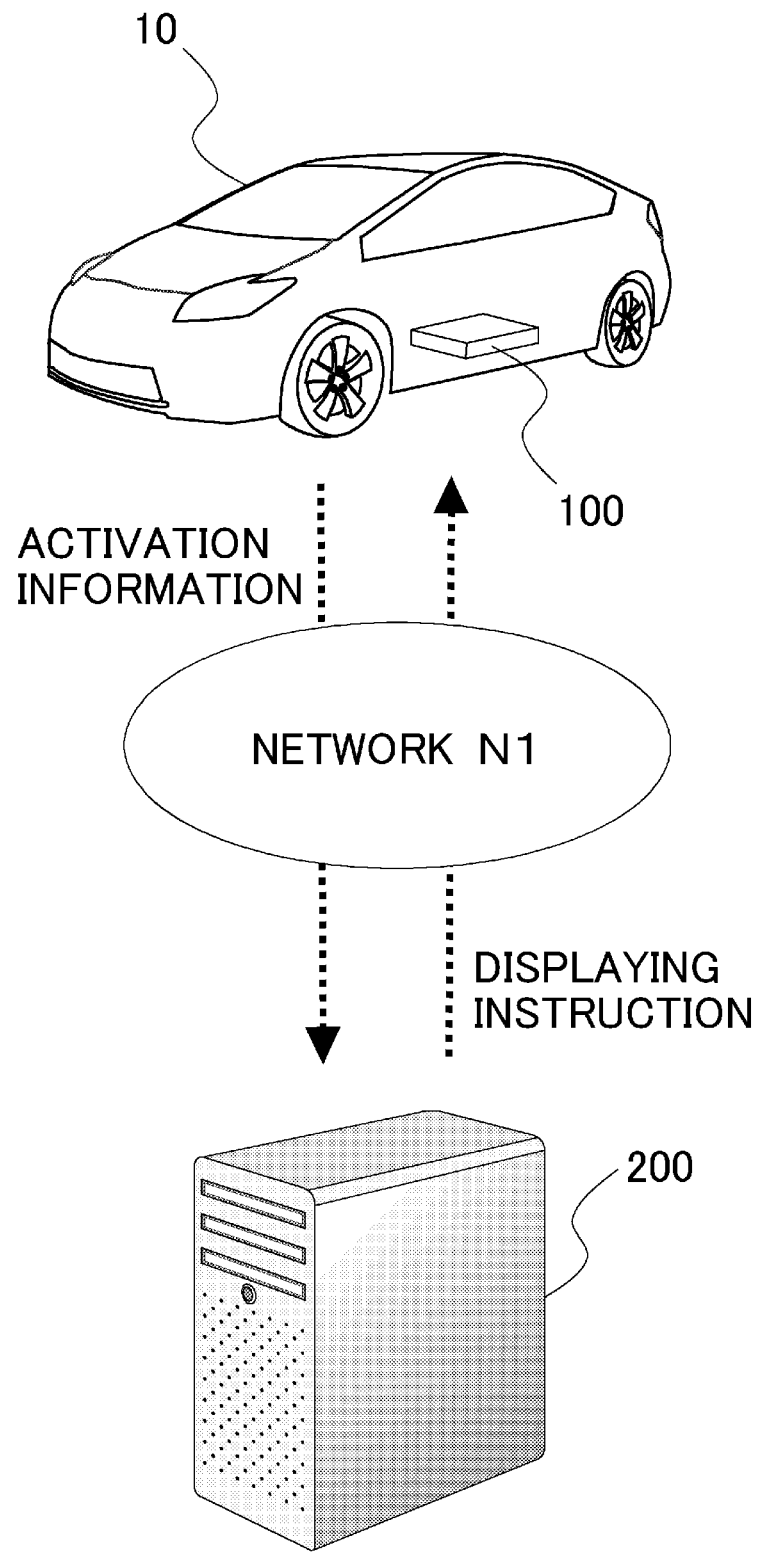

[Fig. 2]
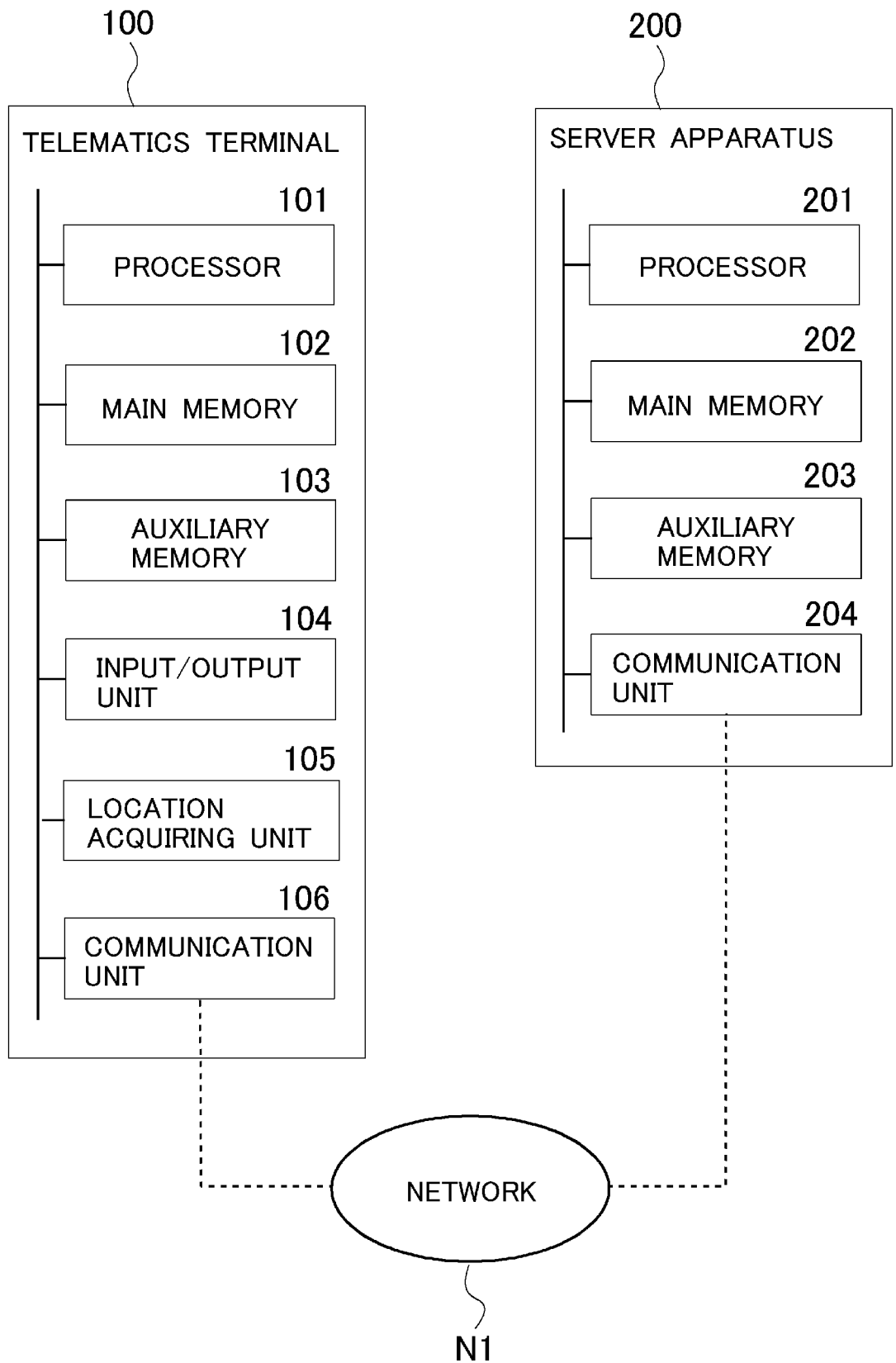

[Fig. 3]
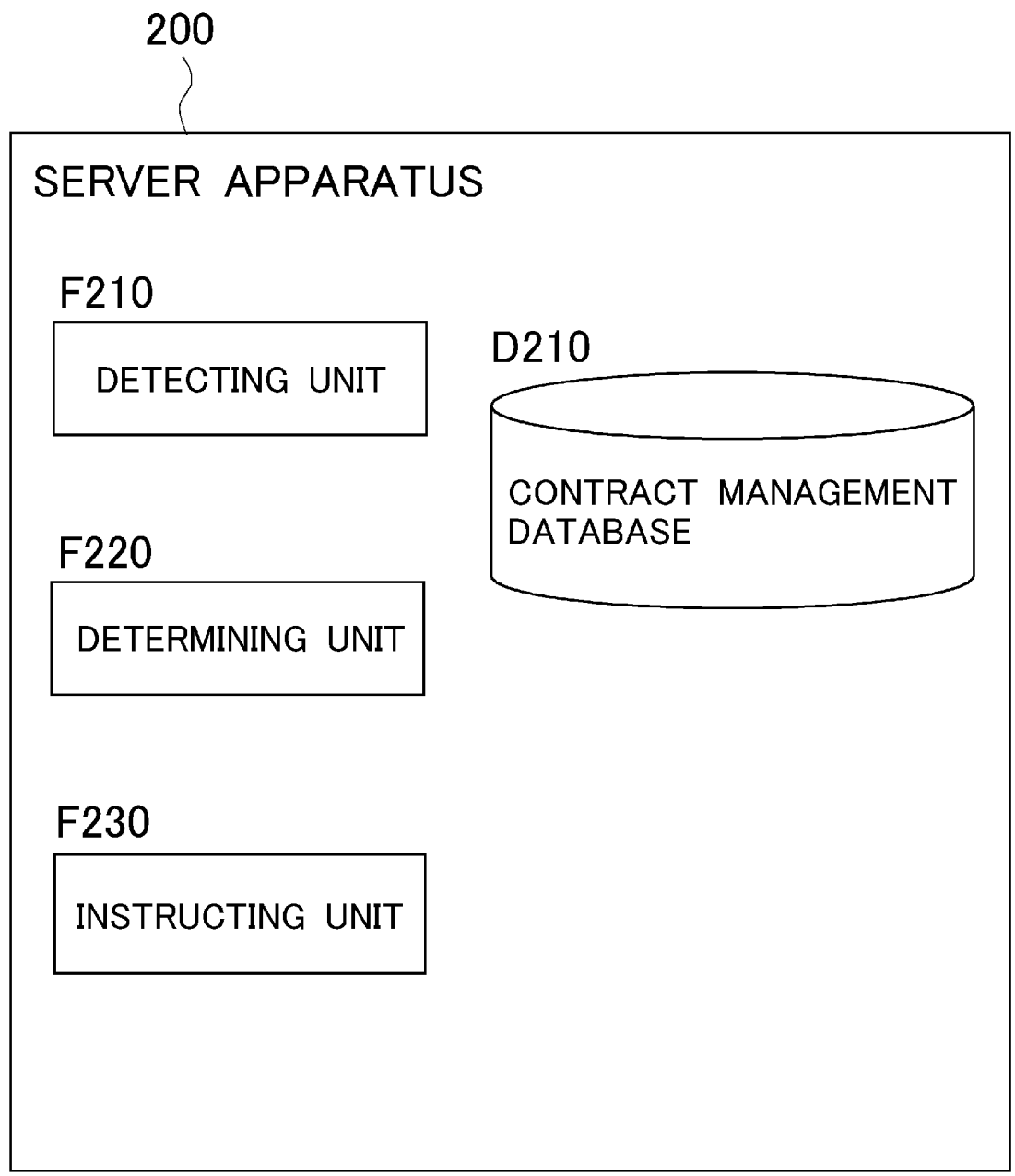

[Fig. 4]

| TERMINAL ID | CONTRACT USER INFORMATION | TRANSMISSION DATE AND TIME | |
|---|---|---|---|
| D001 | --- | --- | } CONTRACT INFORMATION TABLE |
| D002 | --- | --- | } CONTRACT INFORMATION TABLE |
| D003 | --- | --- | } CONTRACT INFORMATION TABLE |
| ⋮ | ⋮ | ⋮ | |

[Fig. 5]
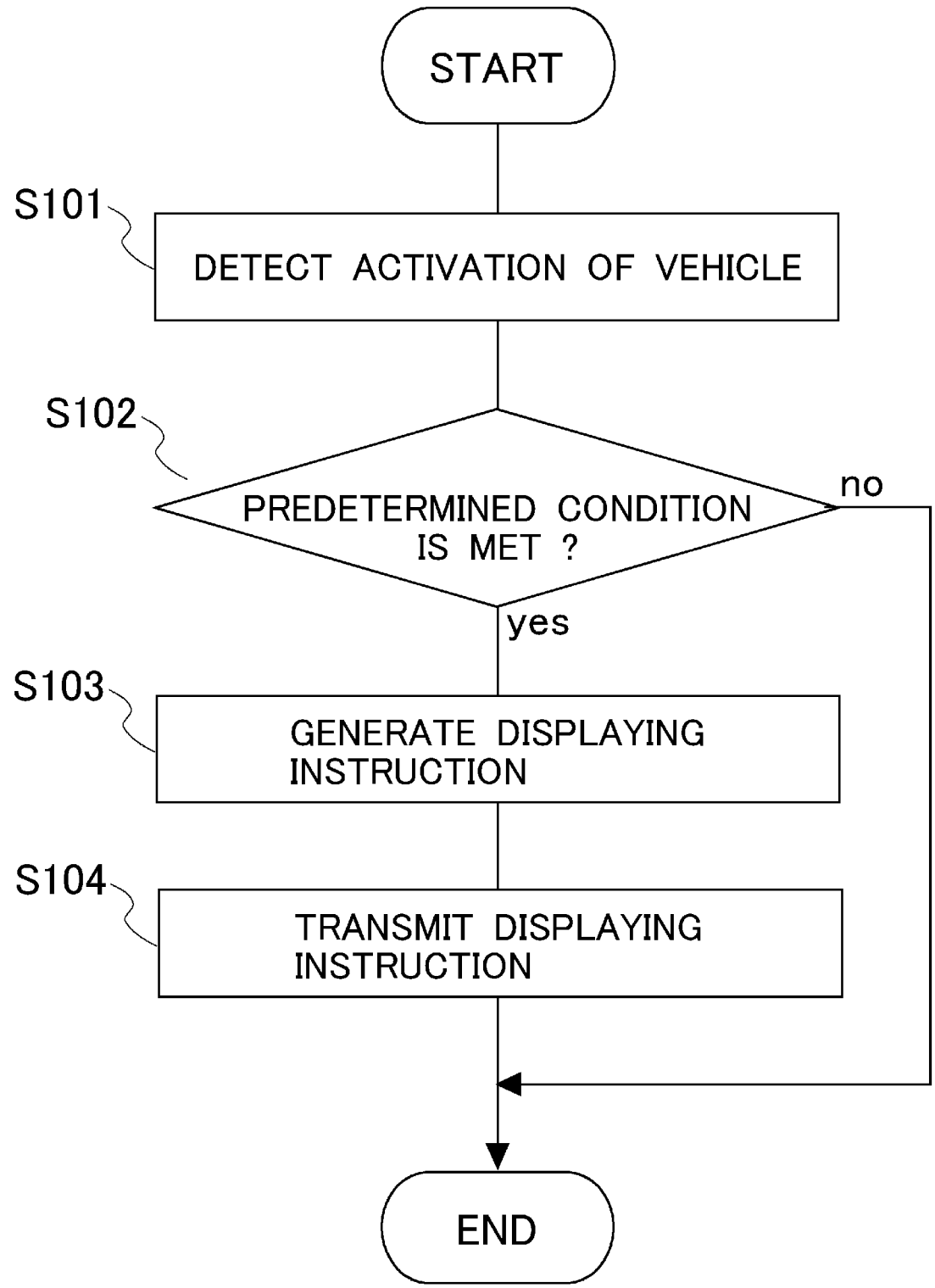

[Fig. 6]

TELEMATICS SERVICE IN USE
(EXPIRATION: OCTOBER 2023)
CONTRACTOR'S ACCOUNT: ○○***@▲▲**.jp

| | | |
|---|---|---|
| INTERNET | NAVIGATION | WEATHER |
| OPERATOR SERVICE | HELP NET | NEWS |
| ▪ | ▪ | ▪ |
| ▪ | ▪ | ▪ |

[Fig. 7]
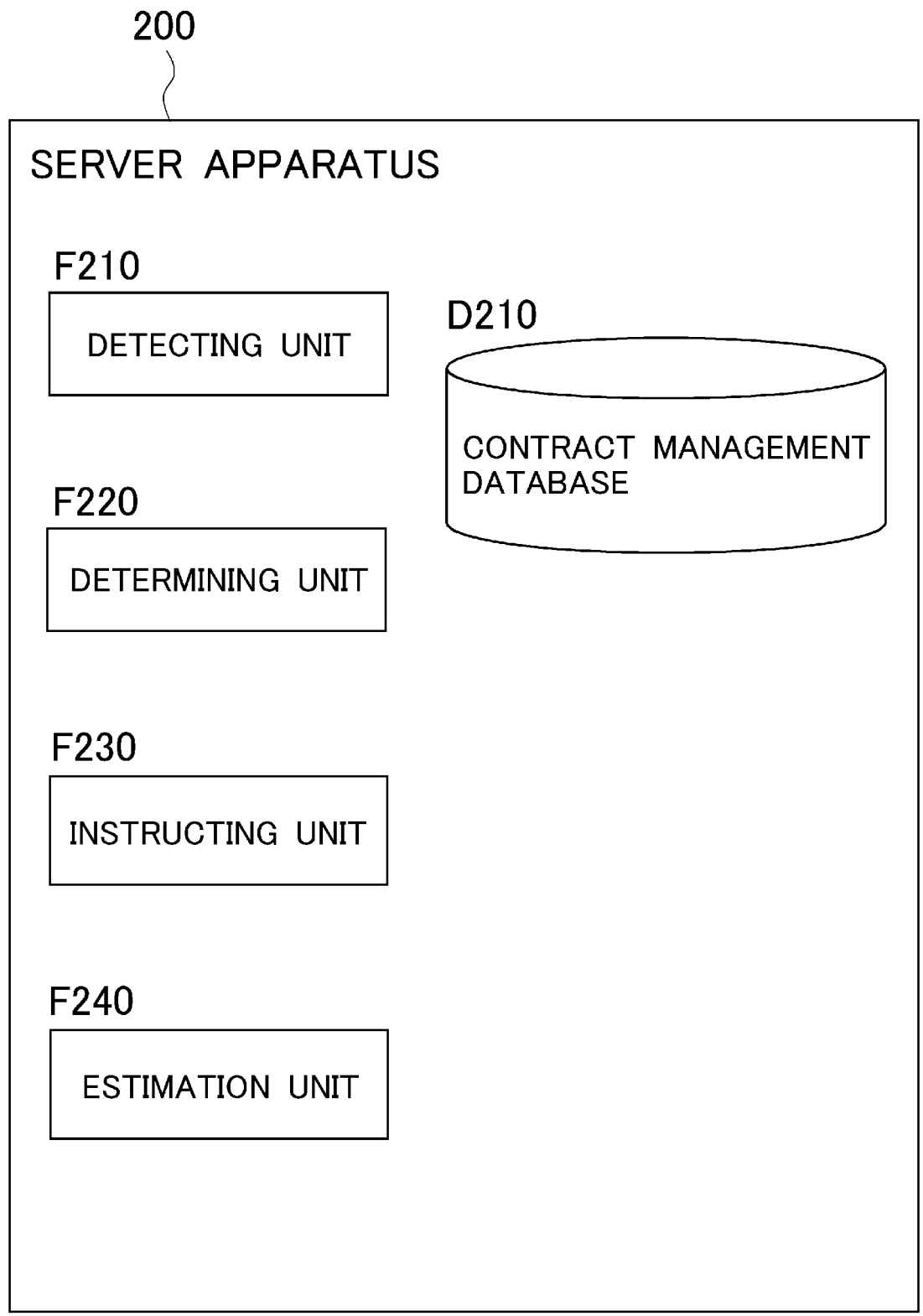

[Fig. 8]

| TERMINAL ID | CONTRACT USER INFORMATION | STORAGE LOCATION | FLAG |
|---|---|---|---|
| D001 | --- | --- | ON |
| D002 | --- | --- | OFF |
| D003 | --- | --- | OFF |
| ⋮ | ⋮ | ⋮ | |

- D001 row: } CONTRACT INFORMATION TABLE
- D002 row: } CONTRACT INFORMATION TABLE
- D003 row: } CONTRACT INFORMATION TABLE

[Fig. 9]
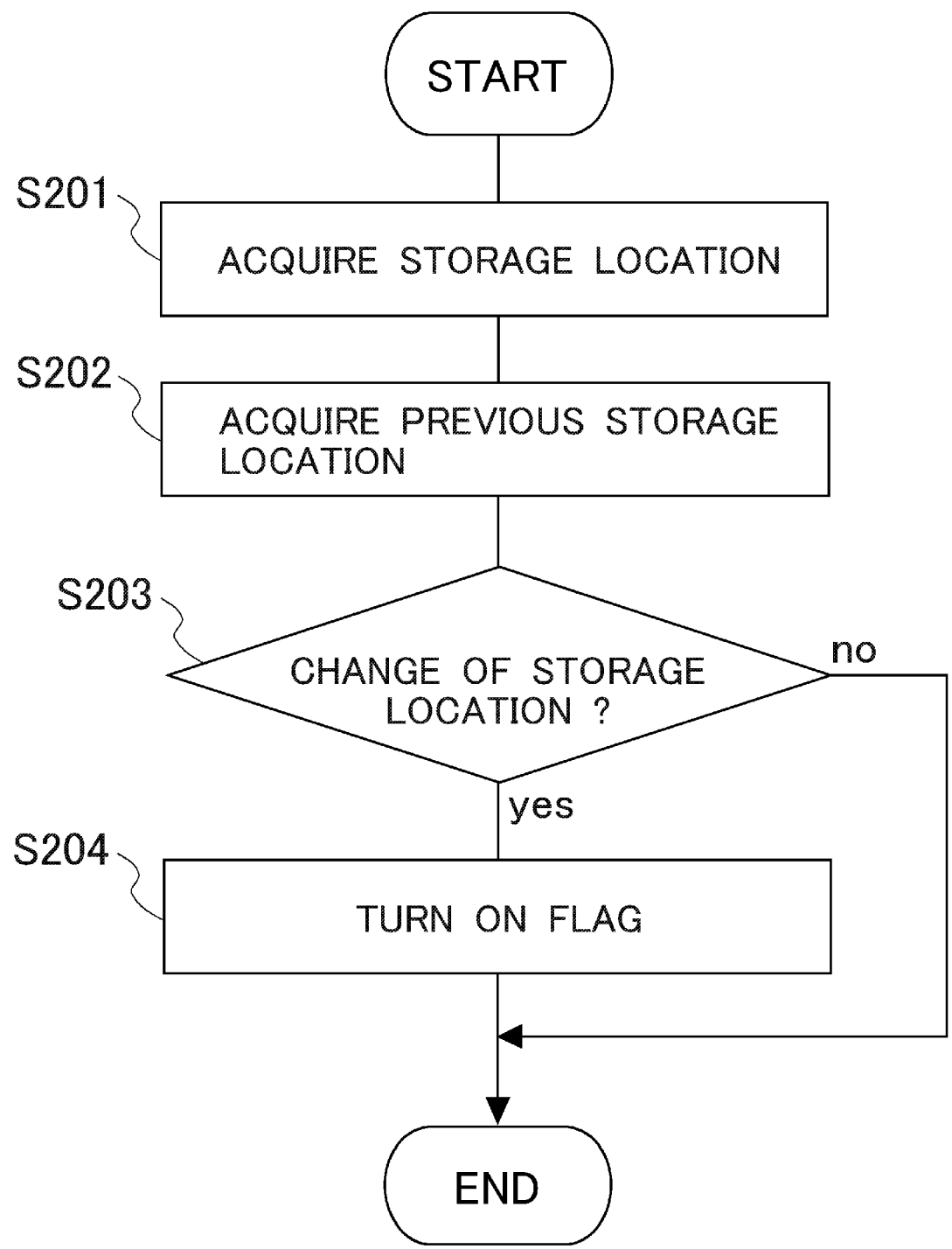

[Fig. 10]
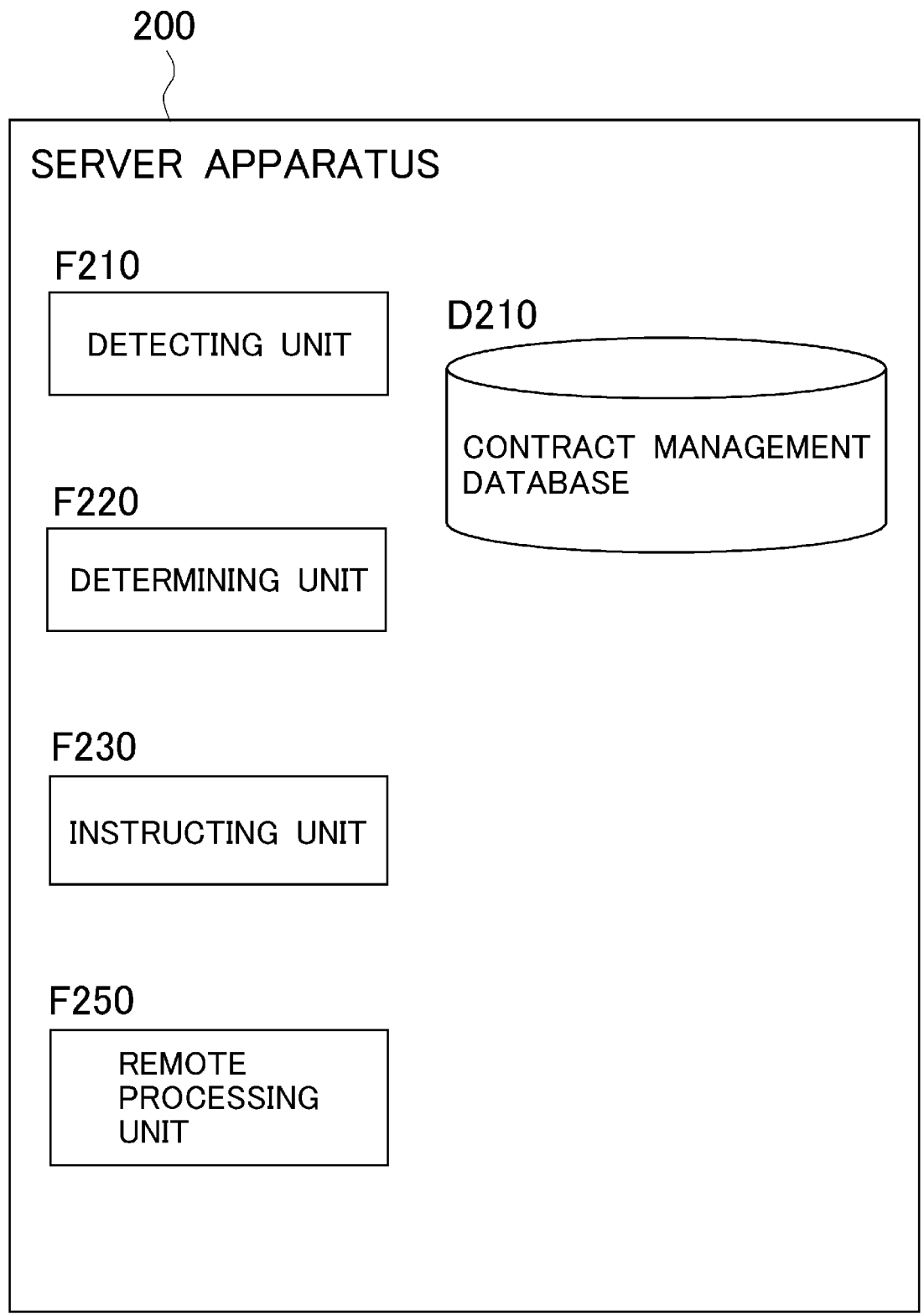

[Fig. 11]

| TERMINAL ID | CONTRACT USER INFORMATION | FLAG |
|---|---|---|
| D001 | — — — | ON |
| D002 | — — — | OFF |
| D003 | — — — | OFF |
| ⋮ | ⋮ | |

- D001 row: CONTRACT INFORMATION TABLE
- D002 row: CONTRACT INFORMATION TABLE
- D003 row: CONTRACT INFORMATION TABLE

[Fig. 12]

| TERMINAL ID | CONTRACT USER INFORMATION | USE DATE AND TIME | |
|---|---|---|---|
| D001 | — — — | — — — | } CONTRACT INFORMATION TABLE |
| D002 | — — — | — — — | } CONTRACT INFORMATION TABLE |
| D003 | — — — | — — — | } CONTRACT INFORMATION TABLE |
| ⋮ | ⋮ | ⋮ | |

INFORMATION PROCESSING APPARATUS, INFORMATION PROCESSING METHOD, AND TELEMATICS TERMINAL

CROSS REFERENCE TO THE RELATED APPLICATION

This application claims the benefit of Japanese Patent Application No. 2021-100454, filed on Jun. 16, 2021, which is hereby incorporated by reference herein in its entirety.

BACKGROUND

Technical Field

The present disclosure relates to an information processing apparatus, an information processing method, and a telematics terminal.

Description of the Related Art

In recent years, a technique for providing a telematics service through a tablet-type terminal that can be carried by a vehicle occupant is known (see, for example, Patent Literature 1 in the following citation list).

CITATION LIST

Patent Literature

Patent Literature 1: Japanese Patent Application Laid-Open No. 2017-226399

SUMMARY

An object of the present disclosure is to provide a technology that can suppress loss of convenience of a user who uses a telematics service.

The present disclosure relates to an information processing apparatus. The information processing apparatus may comprise, for example, a controller including at least one processor, the controller may being programmed to execute the processing of: transmitting a first instruction to a telematics terminal mounted on a vehicle to cause an information about a first user who is associated with the vehicle to be displayed, in a case where a predetermined condition is met at a time of activation of the vehicle.

The present disclosure also relates to an information processing method. The information processing method may comprise, for example, the following steps of processing executed by a computer: transmitting a first instruction to a telematics terminal mounted on a vehicle to cause an information about a first user who is associated with the vehicle to be displayed, in a case where a predetermined condition is met at a time of activation of the vehicle.

The present disclosure also relates to a telematics terminal mounted on a vehicle. The telematics terminal may comprise, for example, a controller including at least one processor, the controller may being programmed to execute the processing of: displaying an information about a first user who is associated with the vehicle, in a case where a predetermined condition is met at a time of activation of the vehicle.

The present disclosure also relates to an information processing program for causing a computer to execute the above-described information processing method, or a non-transitory storage medium for storing the information processing program. The present disclosure also relates to a method by which the telematics terminal described above executes the processing described above, a program for causing the telematics terminal to execute the method, or a non-transitory storage medium storing the program.

According to the present disclosure, it is possible to provide a technology that can suppress loss of convenience of a user who uses the telematics service.

BRIEF DESCRIPTION OF THE DRAWINGS

FIG. 1 is a diagram illustrating the general configuration of a telematics system.

FIG. 2 is a diagram illustrating an exemplary hardware configuration of a telematics terminal and a server apparatus included in the telematics system.

FIG. 3 is a block diagram illustrating an exemplary functional configuration of a server apparatus according to an embodiment.

FIG. 4 is a diagram illustrating an exemplary configuration of a contract information table stored in the contract management database according to the embodiment.

FIG. 5 is a flow chart of a processing routine executed by the server apparatus according to the embodiment.

FIG. 6 illustrates an example of a screen displayed on the telematics terminal when a displaying instruction is received.

FIG. 7 is a block diagram illustrating an exemplary functional configuration of a server apparatus according to a first modification.

FIG. 8 is a diagram illustrating an exemplary configuration of a contract information table stored in a contract control database according to the first modification.

FIG. 9 is a flow chart of a processing routine executed by the server apparatus according to the first modification.

FIG. 10 is a block diagram illustrating an exemplary functional configuration of a server apparatus according to a third modification.

FIG. 11 is a diagram illustrating an exemplary configuration of a contract information table stored in a contract control database according to the third modification.

FIG. 12 is a diagram illustrating an exemplary configuration of a contract information table stored in a contract control database according to a fourth modification.

DESCRIPTION OF THE EMBODIMENTS

An information processing apparatus disclosed herein is applied to a system for providing a telematics service (hereinafter sometimes referred to as "telematics systems"). The telematics service includes, for example, services such as searching for information, updating map data of a car navigation system, setting a destination on the car navigation system, providing emergency call, providing vehicle maintenance information, providing voice call with operator, or providing a remote controlling of the vehicle. The telematics system provides the telematics service to vehicle occupants through two-way communication between a telematics terminal mounted on the vehicle and an information processing apparatus installed outside the vehicle. In such a telematics system, the vehicle on which the telematics terminal is mounted is associated with a user (first user) subscribing to the telematics service. The user associated with the vehicle on which the telematics terminal is mounted is a user who has a right of an ownership of the vehicle (user who purchased the vehicle) or a right of a usage of the vehicle (user who leases the vehicle).

Here, the right of the ownership of the vehicle or the right of the usage of the vehicle equipped with the telematics terminal may be transferred from the first user to the second user (e.g., the vehicle may be sold from the first user to the second user, etc.). In such cases, the convenience of the first user and the second user may be compromised if the first user forgets to cancel the telematics service contract. For example, a subscription fee may be unnecessarily charged to the first user, or the second user may not be able to utilize the telematics service. Also, there is a risk that the vehicle may be remotely controlled against the intent of the second user.

In contrast, in the information processing apparatus according the present disclosure, the controller detects the activation of the vehicle. For example, when the vehicle is activated, an information indicating an activation of the vehicle may be transmitted from the telematics terminal to the information processing apparatus. "The activation of the vehicle" means that the accessory power supply of the vehicle is energized (e.g., an accessory switch is operated from OFF to ON), or that a prime mover of the vehicle is operable (e.g., an ignition switch is operated from OFF to ON, or a power switch is operated from OFF to ON). The controller transmits a first instruction to the telematics terminal when a predetermined condition is met at the time of detecting the activation of the vehicle. The first instruction is an instruction for displaying the first user information. The first user information is an information about the first user who is associated with vehicle at the present time. In the following description, the first instruction may be referred to as a displaying instruction.

The telematics terminal which has received the displaying instruction displays the first user information. For example, the telematics terminal causes a display device mounted on the vehicle to display the first user information. This allows vehicle occupants to check whether the user who has the right of the ownership or the right of the usage of the vehicle matches the first user. For example, if the right of the ownership or the usage of the vehicle has been transferred from the first user to the second user, the second user can be made aware of the fact that the first user has forgotten to cancel the telematics contract. As a result, the second user can take steps to cancel the contract for the telematics service concerning the first user. Thereby, it is possible to suppress that a subscription fee is unnecessarily charged to the first user, that the second user cannot use the telematics service, or that the vehicle is remotely controlled against the intention of the second user. Therefore, it is possible to prevent the usefulness of the first user and the second user from being compromised.

The predetermined condition according to the present disclosure may be a condition regarding a frequency of displaying the first user information. The information processing apparatus may include a memory for storing a first date and time. The first date and time is a date and time when the displaying instruction to the telematics terminal was last transmitted. The controller may determine that the predetermined condition is met when an elapsed time from the first date and time stored in the memory to a date and time when the activation of vehicle is detected is equal to or longer than a first time length. This allows the first user information to be presented to the occupant of the vehicle on a regular basis. As a result, the occupant of the vehicle can periodically recognize that the telematics service contract is valid, i.e., that the telematics service is available. This can encourage the occupant of the vehicle to use the telematics services.

The predetermined condition according to the present disclosure may be a condition relating to a storage location of the vehicle. This is because the right of ownership of the vehicle or the right of usage of the vehicle may have been transferred, if the storage location of the vehicle has changed. Thus, the information processing apparatus according to the present disclosure may comprise a memory storing a first flag that is turned ON when the storage location of the vehicle is changed and turned OFF when the displaying instruction is transmitted. The controller may determine that the predetermined condition is met when the first flag is ON. This causes the first user information to be displayed in the telematics terminal only if the right of the ownership of the vehicle or the right of usage of the vehicle may have been transferred. As a result, it is possible to suppress the occupant from feeling troubled.

The switching of the first flag from the OFF state to the ON state may be performed in the following three procedures.

Procedure 1: Estimate periodically the storage location of the vehicle based on a location information of the vehicle obtained through the telematics terminal.

Procedure 2: Determine whether the estimated storage location of the vehicle has been changed from the storage location estimated last time.

Procedure 3: Turn ON the first flag when it is determined that the estimated storage location of the vehicle has been changed from the previously estimated storage location.

In a case where a car navigation system that performs route guidance is included in the telematics terminal, the switching of the first flag from the OFF state to the ON state may be performed in the following three procedures.

Procedure 4: Obtain periodically an information of the storage location of the vehicle registered in the car navigation system (a location of user's home, a location of the parking lot, or the like).

Procedure 5: Determine whether the acquired information of the storage location indicates a location that differs from the previously acquired storage location.

Procedure 6: Turn ON the first flag if it is determined that the acquired information of the storage location indicates a location that differs from the previously acquired storage location.

The predetermined condition according to the present disclosure may be a condition relating to remote controlling of the vehicle. The remote controlling referred to herein includes, for example, remote controlling an air conditioning system of the vehicle, a security system of the vehicle, or the like through an application program installed in a mobile terminal or the like of the first user. The information processing apparatus may include a memory storing a second flag that is turned ON when a vehicle remote controlling is executed and turned OFF when the displaying instruction is transmitted to the telematics terminal. The controller may determine that the predetermined condition is met when the second flag is ON. This allows the occupant of the vehicle to be encouraged to use the telematics service other than remote controlling.

The predetermined condition according to the present disclosure may be a condition relating to a use frequency of the telematics service. The information processing apparatus according to the present disclosure may comprise a memory storing a second date and time. The second date and time is a date and time when the telematics service was last utilized. The controller according to the present disclosure may determine that the predetermined condition is met when an elapsed time from the second date and time to the date and time when the activation of the vehicle is detected is equal to or longer than a second time length. This ensures that the first user information is displayed in the telematics terminal only when the telematics service is used infrequently. As a result, it is possible to suppress the occupant from feeling troubled, and to promote the use of the telematics service.

The predetermined condition according to the present disclosure may be a condition regarding the number of trips that the first user is not on the vehicle. This is because if trips are repeated in succession while the first user is not riding in the vehicle, the right of the ownership of the vehicle or the right of the usage of the vehicle may have been transferred. Therefore, the controller according to the present disclosure may determine that the predetermined condition is met when a trip is repeated a predetermined number of times in succession while the first user is not riding in vehicle. Here, a trip is, for example, a period from when an activation switch of the vehicle is turned ON by the occupant until it is turned OFF. This results in the first user information being displayed in the telematics terminal only when the right of the ownership of the vehicle or the right of the usage of the vehicle may have been transferred. As a result, it is possible to suppress the occupant from feeling troubled.

The controller according to the present disclosure may determine whether the first user is riding in the vehicle based on a location of the vehicle and a location of a mobile terminal of the first user during travelling. Alternatively, by analyzing a captured images of a camera for capturing an inside of the vehicle, it may be determined whether the first user is riding in the vehicle. In addition, it may be determined whether or not the first user is riding in the vehicle by polling the mobile terminal of the first user using a short-range wireless communication of Bluetooth (registered trademark) LowEnergy standard or the like.

The first user information according to the present disclosure may be part of a first user e-mail address. This makes it possible to suppress a user who has the right of the ownership of the vehicle or the right of the usage of the vehicle from acquiring the personal information of the first user when the user having the right of the ownership of the vehicle or the right of the usage of the vehicle differs from the first user. The first user information is not limited to the above, and may be, for example, a part of a telephone number of the first user, a nickname of the first user, or the like.

The present disclosure can also be regarded as an information processing method in which a computer executes the processing described above, or as an information processing program for causing a computer to execute the processing described above. The computer corresponds to the information processing apparatus described above. Such a computer may be, for example, a server apparatus under the control of a telematics service provider.

The present disclosure also relates to a telematics terminal mounted on the vehicle. In this instance, a controller of the telematics terminal may determine whether a predetermined condition is met when the vehicle is activated. If the predetermined condition is met, controller of the telematics terminal may display the first user information.

Embodiment

Hereinafter, specific embodiments of the present disclosure will be described with reference to the drawings. The configuration described in this embodiment is illustrative, and the present disclosure is not limited to the illustrative configuration of this embodiment.

(General Configuration of System)

FIG. 1 is a diagram illustrating a general configuration of a telematics system to which the present disclosure is applied. The telematics system in the present embodiment includes a telematics terminal 100 mounted on a vehicle 10 and a server apparatus 200 installed outside the vehicle 10. The telematics terminal 100 and server apparatus 200 communicate bidirectionally over network N1. Incidentally, in FIG. 1, although only one vehicle 10 is shown, in some cases a plurality of vehicle 10 is included in the telematics system.

The telematics terminal 100 accepts operations related to the telematics service and transmits a request corresponding to the accepted operation to server apparatus 200. In addition, the telematics terminal 100 receives information returned from server apparatus 200 in response to the above-mentioned request, and presents the received information to the occupant of the vehicle 10. For example, when an occupant of the vehicle 10 performs an operation to specify a destination, the telematics terminal 100 transmits a route search request including an information about a present location of the vehicle 10 and the destination of the vehicle 10 to server apparatus 200. In response to this, when the route search result is returned from server apparatus 200, the telematics terminal 100 receives the above route search result. The telematics terminal 100 executes a setting of the destination in a car navigation system, a setting of a route from the present location to the destination, and the like, based on the received route search result. If the signal returned from the server apparatus 200 to the telematics terminal 100 includes a data for updating a map information, the telematics terminal 100 also updates the map information registered in the car navigation system.

The operation related to the telematics service is not limited to the example described above. The operation related to the telematics service may be, for example, an operation for requesting an information search of weather, shops, tourist spots, or the like. The operations related to the telematics service may be an operation that requests a voice call with an operator. The operation related to the telematics service may be an operation that request an Internet connectivity. However, the telematics terminal 100 (vehicle 10 on which the telematics terminal 100 is mounted) is linked to a user that subscribes to the telematics service (hereinafter sometimes referred to as "contract user"). Therefore, the telematics terminal 100 only accepts operations related to the telematics services contracted by the contracted user. It should be noted that the telematics service contract can be made only by a user who has the right of the ownership of the vehicle 10 or the right of the usage of the vehicle 10. That is, only one contract user is associated with the telematics terminal 100. The contract user corresponds to the "first user" according to the present disclosure.

The telematics terminal 100 according to the present embodiment has a function of a transmitting, when the vehicle 10 is activated, an information (activation information) indicating an activation of the vehicle 10 to the server apparatus 200. The activation of the vehicle is, for example, an accessory switch is operated from OFF to ON, an ignition switch is operated from OFF to ON, or a power switch is operated from OFF to ON. The activation information according to the present embodiment includes a terminal identifier (terminal ID) of the telematics terminal 100. The telematics terminal 100 also has a function of displaying the contract user information for the contract user in accordance with a displaying instruction from the server apparatus 200. The "contract user information" is an information capable of identifying whether a user having the right of the ownership of the vehicle 10 or the right of usage of the vehicle 10 matches the contract user. In addition, the "contract user information" is an information in which a third party cannot identify the contract user personally. Such contract user information may be, for example, part of an email address of the contract user, part of a telephone number of the contract user, or a nickname of the contract user.

The server apparatus 200 is managed by a Telematics Service Provider (TSP). The server apparatus 200 has a function of accepting various requests related to a telematics service as described above from the telematics terminal 100. The server apparatus 200 also has a function of providing the telematics terminal 100 with an information in response to the accepted request. Further, the server apparatus 200 according to the present embodiment also has a function of determining whether or not a predetermined condition is met when receiving the activation information from the telematics terminal 100. The predetermined condition is a condition for determining whether or not the contract user information is displayed. The predetermined condition according to the present embodiment is that a first time length or more has elapsed from a date and time when the contract user information was last displayed. If it is determined that such a predetermined condition is met, the server apparatus 200 transmits the displaying instruction for displaying the contract user information to the telematics terminal 100.

(Hardware Configuration of System)

FIG. 2 is a diagram illustrating exemplary configurations of the telematics terminal 100 and the server apparatus 200 included in the telematics system.

(Telematics Terminal)

The telematics terminal 100 is a small computer mounted on vehicle 10. As shown in FIG. 2, the telematics terminal 100 includes a processor 101, a main memory 102, an auxiliary memory 103, an input/output unit 104, a location acquiring unit 105, and a communication unit 106. The processor 101, the main memory 102, the auxiliary memory 103, input/output unit 104, location obtaining unit 105, and communication unit 106 are connected to each other by buses. The main memory 102 and the auxiliary memory 103 are computer-readable recording media. The hardware configuration of the telematics terminal 100 is not limited to the hardware configuration shown in FIG. 2, and components of the hardware configuration may be omitted, replaced, or added as appropriate.

The telematics terminal 100 achieves functions that meet a predetermined purpose by the processor 101 executing a program stored in the auxiliary memory 103. It should be noted that some or all of the functions of the telematics terminal 100 may be achieved by hardware circuits such as ASIC (Application Specific Integrated Circuit) or FPGA (Field Programmable Gate Array).

The processor 101 is, for example, a CPU (Central Processing Unit) or DSP (Digital Signal Processor). The processor 101 controls the telematics terminal 100 by performing various information processing operations.

The main memory 102 includes, for example, RAM (Random Access Memory) and ROM (Read Only Memory). The auxiliary memory 103 is, for example, an EPROM (Erasable Programmable ROM or a Hard Disk Drive.

The auxiliary memory 103 may include a removable medium, i.e., a portable recording medium. The removable medium is, for example, a USB (Universal Serial Bus) memory, a CD (Compact Disc), a DVD (Digital Versatile Disc), or the like. The auxiliary memory 103 stores various programs, various data, and various tables in a read/write format. Programs stored in the auxiliary memory 103 include programs related to the telematics service in addition to the operating system (OS). Programs related to the telematics service include, for example, a program for achieving the function of the car navigation system by the telematics terminal 100, a program for browsing the Internet, and the like. Programs related to telematics service also include a program for achieving the function of transmitting the activation information to the server apparatus 200 and a program for achieving the function of displaying the contract user information in accordance with the displaying instruction from the server apparatus 200. A part or all of information stored in the auxiliary memory 103 may be stored in the main memory 102.

The input/output unit 104 accepts an input action performed by a user and presents an information to the user. The input/output unit 104 is composed of, for example, a touch panel and its control circuit, a liquid crystal display and its control circuit, a microphone and its control circuit, a speaker and its control circuit, and the like. The touch panel and the liquid crystal display may be composed of a one touch panel display. The input/output unit 104 according to the present embodiment outputs the contract user information through the touch panel display when it receives a displaying instruction from the server apparatus 200.

The location acquisition unit 105 is a device that acquires a present location of the telematics terminal 100 (a present location of the vehicle 10). Typically, the location acquisition unit 105 is configured to include a receiver of a GPS (Global Positioning System).

The communication unit 106 is a radio communication interface for connecting the telematics terminal 100 to a network N1. The communication unit 106 connects to the network N1 using, for example, a mobile communications service or a wireless communication network such as Wi-Fi, and communicates with the server apparatus 200 through the network N1. The mobile communication service is, for example, a communication service such as 5G (5th-Generation) or LTE (Long Term Evolution).

The network N1 may be, for example, a WAN (Wide Area Network), a worldwide public communications network such as the Internet, or any other communications network. The network N1 may include a telephone communication network such as a mobile telephone or a wireless communication network such as Wi-Fi (registered trademark).

(Server Apparatus)

The server apparatus 200 is a computer installed outside the vehicle 10. In the present embodiment, the server apparatus 200 is installed in a business office or the like of the TSP. As shown in FIG. 2, the server apparatus 200 includes a processor 201, a main memory 202, an auxiliary memory 203, and a communication unit 204. These are connected to each other by a bus. The hardware configuration of the server apparatus 200 is not limited to the hardware configuration shown in FIG. 2, and components of the hardware configuration may be appropriately omitted, replaced, or added.

The processor 201, the main memory 202, and the auxiliary memory 203 of the server apparatus 200 are similar to the processor 101, the main memory 102, and the auxiliary memory 103 of the telematics terminal 100, respectively. However, programs stored in the auxiliary memory 203 include a program for achieving a function of displaying the contract user information on the telematics terminal 100.

The communication unit 204 is a communication interface for connecting the server apparatus 200 to network N1. The communication unit 204 is, for example, a LAN (Local Area Network) interface board or a wireless communication circuitry for wireless communication. The communication unit 204 connects to the network N1 and communicates with the telematics terminal 100 through the network N1.

(Functional Configuration of Server Apparatus)

Next, the functional configuration of the server apparatus 200 will be described with reference to FIG. 3. As shown in FIG. 3, the server apparatus 200 according to the present embodiment includes, as its functional components, a detecting unit F210, a determining unit F220, an instructing unit F230, and a contract management database D210. The detecting unit F210, the determining unit F220, and the instructing unit F230 are achieved by the processor 201 of the server apparatus 200 executing programs stored in the auxiliary memory 203. All or part of the detecting unit F210, the determining unit F220, and the instructing unit F230 may be achieved by hardware circuits such as an ASIC or a FPGA. The contract management database D210 is built on the auxiliary memory 203 by the processor 201 of the server apparatus 200 executing a program of a DBMS (Database Management System). The contract management database D210 is, for example, a relational database.

Note that processing of any or a portion of the functional components of the server apparatus 200 may be performed by other computers coupled to network N1. For example, each process included in the detecting unit F210, each process included in the determining unit F220, and each process included in the instructing unit F230 may be executed by a separate computer.

The contract management database D210 stores an information relating to the contract user. The contract management database D210 stores, for example, information that associates the contract user information with the telematics terminal 100. Here, a configuration example of information stored in the contract management database D210 will be described based on FIG. 4. FIG. 4 is a diagram illustrating a table structure of information stored in the contract management database D210. In the illustration shown in FIG. 4, a plurality of tables configured for each telematics terminal are stored in the contract management database D210. Note that the configuration of the table stored in contract management database D210 (hereinafter, sometimes referred to as "contract information table") is not limited to the examples shown in FIG. 4, and fields can be added, changed, or deleted as appropriate.

The contract information table in this embodiment has fields for a terminal ID, a contract user information, and a transmission date and time, as shown in FIG. 4. In the terminal identifier field, an information (terminal ID) is registered to identify the telematics terminal 100. In the contract user information field, the contract user information of the contract user who is associated with the telematics terminal 100 is registered. The contract user information is, as described above, an information capable of identifying whether or not the contract user coincides with a user having the right of the ownership of vehicle 10 or the right of the usage of the vehicle 10, and is an information in which a third party cannot determine the identity of the contract user. Such contract user information may include, for example, a portion of an e-mail address of the contract user (a string in which a portion of the e-mail address is hidden), a portion of a telephone number of the contract user (a string in which a portion of the telephone number is hidden), or a nickname of the contract user. In the present embodiment, a part of the e-mail address of the contract user is used as the contract user information.

Note that the contract user in which the contract user information is registered in the contract user information field is not necessarily the same as a user having the right of the usage of the vehicle 10 on which the telematics terminal 100 is mounted that is associated with the contract user. For example, the contract user may forget to cancel the contract for the telematics service when the right of the usage of the vehicle 10 is transferred from the contract user to another user. If so, information of a user that differs from the user having the right of the usage of the vehicle 10 remains registered in the contract user information field.

In the transmission date and time field of the contract information table, an information indicating a date and time that the displaying instruction was last transmitted to the telematics terminal 100 is registered. In other words, an information indicating a date and time that the contract user information was last displayed in the telematics terminal 100 is registered in the transmission date and time field. The date and time registered in the transmission date and time field corresponds to the "first date and time" according to the present disclosure. Note that information registered in the transmission date and time field is updated each time the displaying instruction is transmitted to the telematics terminal 100.

The contract information table described above is registered in the contract management database D210 when the contract user enters into a contract for use of telematics services with the TSP. The contract information table is deleted from the contract management database D210 when the contract user cancels the telematics service usage contract. In the present embodiment, the auxiliary memory 203 corresponds to the "memory" according to the present disclosure.

Here, the description returns to FIG. 3. The detecting unit F210 detects the activation of the vehicle 10 on which the telematics terminal 100 is mounted. Specifically, the detecting unit F210 receives an activation information from the telematics terminal 100 through the communication unit 204, thereby detecting the activation of the vehicle 10 on which the telematics terminal 100 is mounted. When the activation of vehicle 10 on which the telematics terminal 100 is mounted is detected, the detecting unit F210 passes the terminal ID included in the activation information to the determining unit F220.

The determining unit F 220 determines whether or not a predetermined condition is met. Specifically, the determining unit F220 accesses the contract management database D210 with the terminal ID received from the detecting unit F210 as an argument. The determining unit F220 identifies the contract information table in which an information matching the above terminal ID is registered in the terminal ID field. The determining unit F220 reads the information (the first date and time) registered in the transmission date and time field of the specified contract information table. The determining unit F220 calculates the elapsed time from the first date and time to the present date and time (the date and time when the detecting unit F210 detects the activation of the vehicle 10). The determining unit F220 determines whether or not the calculated elapsed time is equal to or longer than the first time length. The first time length is a time length set by the TSP, and is, for example, a time length of several days, a time length of several weeks, or a time length of several months. In a case the where the above elapsed time is equal to or longer than the first time length, the determining unit F220 determines that the predetermined condition is met. In this case, the terminal ID passed from the detecting unit F210 to the determining unit F220 is passed from the determining unit F220 to the instructing unit F230. In a case the where the above elapsed time is less than the first time length, the determining unit F220 determines that the predetermined condition is not met. In this case, the terminal ID passed from the detecting unit F210 to the determining unit F220 is not passed from the determining unit F220 to the instructing unit F230.

The instructing unit F230 transmits the displaying instruction to the telematics terminal 100 triggered by the receipt of the terminal ID from the determining unit F220. Specifically, the instructing unit F230 accesses the contract management database D210. The instructing unit F230 identifies the contract information table of which the terminal ID field registers an information matching the terminal ID received from the determining unit F220. The instructing unit F230 reads the contract user information from the contract user information of the specified contract information table. The instructing unit F230 generates the displaying instruction based on the read contract user information. The displaying instruction is an instruction that causes the contract user information to be displayed on the telematics terminal 100. The instructing unit F230 transmits the generated displaying instruction to the telematics terminal 100 through communication unit 204.

(Processing Flow)

The flow of the process performed by the server apparatus 200 according to the present embodiment will be described with reference to FIG. 5. FIG. 5 is a flowchart illustrating a processing routine performed by server apparatus 200 when the server apparatus 200 receives the activation information from the telematics terminal 100. While the processing according to the processing routine of FIG. 5 is executed by the processor 201 of the server apparatus 200, functional components thereof will be mentioned in the following description as components that execute various processing.

In FIG. 5, when the activation information transmitted from the telematics terminal 100 is received by communication unit 204 of server apparatus 200, the activation information is passed from the communication unit 204 to the detecting unit F210. The detecting unit F210 detects activation of the vehicle 10 by receiving the activation information through communication unit 204 (step S101). The detecting unit F210 passes the terminal ID included in the activation information to the determining unit F220.

When the determining unit F220 receives the terminal ID from the detecting unit F210, the determining unit F220 determines whether or not the predetermined condition is met (step S102). Specifically, the determining unit F220 accesses the contract management database D210. The determining unit F220 identifies the contract information table of which the terminal ID field registers the information matching the received terminal ID. The determining unit F220 reads the first date and time registered in the transmission date and time field of the specified contract information table. The determining unit F220 calculates the elapsed time from the first date and time to the present. The determining unit F220 determines whether or not the calculated elapsed time is equal to or longer than the first time length. When the elapsed time is equal to or longer than the first time length, the determining unit F220 determines that the predetermined condition is met (positive determination in step S102). In this case, the terminal ID is passed from the determining unit F220 to the instructing unit F230. Then the process in step S103 is executed. In other words, when the elapsed time is less than the first time length, the determining unit F220 determines that the predetermined condition is not met (negative determination in step S102). In this case, the terminal ID is not passed from the determining unit F220 to the instructing unit F230, and the processing routine is terminated.

In step S103, the instructing unit F230 generates the displaying instruction. The displaying instruction is an instruction that causes the contract user information to be displayed on the telematics terminal 100. In generating such a displaying instruction, the instructing unit F230 accesses the contract management database D210 using the terminal ID received from the determining unit F220 as an argument. The instructing unit F230 identifies the contract information table of which the terminal ID field registers the information matching the above terminal ID. The instructing unit F230 reads the contract user information registered in the contract user information field of the specified contract information table. The instructing unit F230 generates the displaying instruction including the read contract user information. After executing the processing of step S103, the instructing unit F230 executes the processing of step S104.

In step S104, the instructing unit F230 transmits the displaying instruction generated in step S103 to the telematics terminal 100 through communication unit 204.

On the telematics terminal 100 that received the above displaying instruction, the contract user information received from the server apparatus 200 is displayed on the touch panel display of the input/output unit 104. In this case, the displaying instruction may include, for example, a command for displaying a screen as shown in FIG. 6. That is, the displaying instruction may include a command for displaying a screen containing a menu of the telematics service and the contract user information. The menu related to the telematics service includes buttons for selecting the type of telematics service that the occupant of the vehicle 10 wants to use (e.g., Internet-connection, voice communication with an operator, information search, destination setting, etc.), buttons for selecting items for which the occupant of the vehicle 10 wants to change the setting (e.g., user information change, contract content change, etc.), and the like. When the screen as shown in FIG. 6 is displayed on the touch panel display of the input/output unit 104, the occupant of the vehicle 10 can recognize the contract user information. Thus, the occupant of the vehicle 10 can confirm whether the user having the right of the ownership of the vehicle 10 or the right of the usage of the vehicle 10 coincides with the contract user. When the user having the right of the ownership of the vehicle 10 or the right of the usage of the vehicle 10 coincides with the contract user, the occupant can be prompted to use the telematics service through the screen as shown in FIG. 6. In the present embodiment, the screen as shown in FIG. 6 is displayed on condition that a predetermined condition (i.e., the first time length or more has elapsed since the previous display) is met when the vehicle 10 is activated. Therefore, it is possible to suppress the occupant from feeling troubled.

According to the present embodiment, even if the first user forgets to cancel the telematics contract when the right of the usage of the vehicle 10 is transferred from the first user to the second user, it can be recognized by the second user. This allows the second user to take steps to cancel the first user's contract for telematics services. In addition, the contract user information displayed on the telematics terminal 100 is part of the email address, part of the telephone number, or a nickname, and so on. Therefore, it is possible to prevent the second user looking at the contract user information from identifying the person who is the first user. It is also possible to prompt the occupant of the vehicle 10 to use the telematics service if the user having the right of the ownership of the vehicle 10 or the right of the usage of the vehicle 10 matches the contract user. Therefore, the use of the telematics services can be promoted while preventing the loss of the usability of user the using telematics services.

<First Modification>

In the embodiment described above, when the elapsed time from the date and time when the contract user information is last displayed to the date and time when the vehicle 10 is activated is equal to or longer than the first time length, it is determined that the predetermined condition is met. On the other hand, in the present modification, when it is estimated that the right of the ownership of the vehicle 10 or the right of the usage is transferred at the time of activation of the vehicle 10, it is determined that the predetermined condition is met.

(Functional Configuration of Server Apparatus)

FIG. 7 is a block diagram illustrating an example of the functional configuration of server apparatus 200 according to the present modification. The server apparatus 200 according to the present modification includes, as its functional components, an estimation unit F240 in addition to the detecting unit F210, the determining unit F220, the instructing unit F230, and the contract management database D210. These functional components are achieved by the processor 201 of the server apparatus 200 executing a program stored in the auxiliary storage 203.

The estimation unit F240 estimates whether the right of the ownership of the vehicle 10 or the right of the usage of the vehicle 10 may have been transferred. The estimation unit F240 according to the present modification presumes that the right of the ownership of the vehicle 10 or the right of the usage of the vehicle 10 is transferred when the storage location of the vehicle 10 is changed. In making such an estimation, the estimation unit F240 periodically (e.g., every few days, every few weeks, or every few months) obtains an information regarding the storage location of the vehicle 10. The information regarding the storage location of the vehicle 10 may be obtained by periodically transmitting an information about the storage location (such as a home location or a parking lot location) registered in the car navigation system of the telematics terminal 100 from the telematics terminal 100 to the server apparatus 200. Alternatively, a present location acquired by the location acquiring unit 105 of the telematics terminal 100 may be transmitted from the telematics terminal 100 to the server apparatus 200 periodically (e.g., every few minutes or every few hours). The server apparatus 200 may estimate the storage location of the vehicle 10 based on the history of present location received from the telematics terminal 100. For example, the estimation unit F240 may estimate, as the storage location of the vehicle 10, the location where the parking time of the vehicle 10 (the time for which the present location of the vehicle 10 remains at the same location) is the longest in a certain period (e.g., one week or one month).

When the information regarding the storage location of the vehicle 10 is obtained by the above-described methods, the estimation unit F240 determines whether the information regarding the storage location obtained this time indicates the same location as the storage location obtained last time. In the present modification, the information regarding the storage location acquired by the estimation unit F240 last time is registered in the contract information table of the contract management database D210. That is, the contract information table of the present modification has the fields of terminal ID, contract user information, storage location, and flag as shown in FIG. 8. The information registered in the terminal ID field and in the contract user information field is the same as the contract information table (see FIG. 4) in the previous embodiment. The storage location field is a field for registering the information regarding the storage location of the vehicle 10 on which the telematics terminal 100 is mounted. The information registered in the storage location field is updated each time that the storage location is acquired by the estimation unit F240. A flag (corresponding to the "first flag" according to the present disclosure) is registered in the flag field. The flag is turned ON when it is determined that the storage location acquired this time differs from the previously acquired storage location (i.e., when it is determined that the storage location of the vehicle 10 has changed) and is turned OFF when the displaying instruction is transmitted to the telematics terminal 100.

Here, if the information regarding the storage location acquired this time indicates the same location as the storage location acquired last time, the estimation unit F240 estimates that there is no possibility that the right of the ownership of the vehicle 10 or the right of the usage of the vehicle 10 has been transferred. On the other hand, if the information regarding the storage location acquired this time indicates a location that differs from the previously acquired storage location, the estimation unit F240 estimates that the right of the ownership of the vehicle 10 or the right of the usage of the vehicle 10 may have been transferred. Then, the estimation unit F240 turns ON the flag registered in the flag field of the contract information table.

The determining unit F220 according to the present modification determines whether or not a predetermined condition is met based on the flag registered in the flag field of the contract information table. Specifically, the determining unit F220 accesses the contract management database D210 using terminal ID received from detecting unit F210 as an argument. The determining unit F220 identifies the contract information table of which the terminal ID field registers the information matching the above terminal ID. The determining unit F220 determines whether the flag registered in the flag field of the specified contract information table is ON. When the above flag is ON, the determining unit F220 determines that the predetermined condition is met. In this instance, the terminal ID passed from the detecting unit F210 to the determining unit F220 is passed from the determining unit F220 to the instructing unit F230. Then, the instructing unit F230 transmits the displaying instruction to the telematics terminal 100 through communication unit 204. When the instructing unit F230 finishes transmitting the displaying instruction, the instruction unit F230 turns OFF the flag registered in the flag field of the above contract information table. On the other hand, when the above flag is OFF, the determining unit F220 determines that the predetermined condition is not met. In this instance, the terminal ID passed from the detecting unit F210 to the determining unit F220 is not passed from the determining unit F220 to the instructing unit F230. Therefore, the displaying instruction is not transmitted from the instructing unit F230 to the telematics terminal 100.

(Processing Flow)

Here, a flow of a process performed by the server apparatus 200 when estimating whether the right of the ownership of the vehicle 10 or the right of the usage of the vehicle 10 has been transferred will be described with reference to FIG. 9. FIG. 9 is a flow chart illustrating the processing routine that is performed periodically (e.g., every few days, every few weeks, or every few months), in the server apparatus 200. While the processing according to the processing routine of FIG. 9 is executed by the processor 201 of the server apparatus 200, functional components (estimation unit F240) thereof will be mentioned in the following description as components that execute various processing.

In FIG. 9, the estimation unit F240 of the server apparatus 200 acquires the information regarding the storage location of the vehicle 10 on which the telematics terminal 100 is mounted (step S201). Specifically, the estimation unit F240 acquires the information regarding the storage location registered in the car navigation system of the telematics terminal 100 by communicating with the telematics terminal 100. Alternatively, the estimation unit F240 estimates the storage location of the vehicle 10 on which the telematics terminal 100 is mounted based on the history of present location periodically acquired from the telematics terminal 100. After completing the processing of step S201, the estimation unit F240 executes the processing of step S202.

In step S202, the estimation unit F240 acquires the storage location acquired last time. Specifically, the estimation unit F240 reads the information registered in the storage location field in the contract information table of the contract management database D210. After completing the processing of step S202, the estimation unit F240 executes the processing of step S203.

In step S203, the estimation unit F240 compares the storage location obtained in step S201 with the storage location obtained in step S202 in order to determine whether the storage location of the vehicle 10 on which the telematics terminal 100 is mounted has been changed. If the storage location obtained in step S201 is the same as the storage location obtained in step S202, the estimation unit F240 determines that the storage location of the vehicle 10 has not been changed (negative determination in step S203). In this case, the execution of this processing routine is terminated. On the other hand, if the storage location acquired in step S201 differs from the storage location acquired in step S202, the estimation unit F240 determines that the storage location of vehicle 10 has been changed (positive determination in step S203). Then, the estimation unit F240 executes the process of step S204.

In step S204, the estimation unit F240 turns ON the flag registered in the flag field of the contract information table. After the processing of step S204 is executed, the execution of this processing routine is terminated.

Note that the process flow performed by the server apparatus 200 when the server apparatus 200 receives the activation information from the telematics terminal 100 is the same as in FIG. 5 described above. However, in the step S102, the determining unit F220 determines whether or not a predetermined condition is met based on the flag registered in the flag field of the contract information table. That is, if the flag registered in the flag field of the contract information table is ON, it is determined that the predetermined condition is met. On the other hand, if the flag registered in the flag field of the contract information table is OFF, it is determined that the predetermined condition is not met.

According to this modification, the contract user information is displayed on the telematics terminal 100 when the vehicle 10 is activated, only if it is estimated that the right of the ownership of the vehicle 10 or the right of the usage of the vehicle 10 may have been transferred. As a result, the contract user information can be recognized by the occupant of the vehicle 10 while suppressing the occupant from feeling troubled.

<Second Modification>

In the first modification described above, the example has been described in which, when the storage location of the vehicle 10 is changed, the estimation unit F240 estimates that the right of the ownership of the vehicle 10 or the right of the usage of the vehicle 10 may have been transferred. On the other hand, in this modification, an example will be described in which the estimation unit F240 estimates that there is a possibility that the right of the ownership of the vehicle 10 or the right of the usage of the vehicle 10 has been transferred when the trip of the vehicle 10 is continuously repeated while the contract user is not riding in the vehicle 10

If the trip of the vehicle 10 is repeated in succession with the contract user not riding, the right of the ownership of the vehicle 10 or the right of the usage of the vehicle 10 may have been transferred. Therefore, the estimation unit F240 may estimate that the right of the ownership of the vehicle 10 or the right of the usage of the vehicle 10 may have been transferred if the trip of the vehicle 10 is repeated a predetermined number of times in succession while the contract user is not riding in the vehicle. As used herein, trip refers, for example, to the period from when the activation switch (an accessory switch, an ignition switch, or a power switch, etc.) of the vehicle 10 is turned ON by an occupant until it is turned OFF.

The determination of whether the contract user is riding in the travelling vehicle 10 may be based on the location of the telematics terminal 100 and the location of the mobile terminal of the contract user. For example, during a trip of vehicle 10, the estimation unit F240 may identify the travel path of the telematics terminal 100 (the vehicle 10) and the travel path of the mobile terminal of the contract user by periodically obtaining the location of the telematics terminal 100 and the location of the mobile terminal of the contract user (e.g., every few minutes or tens of minutes). Then, the estimation unit F240, if the deviation of both the travel paths is within a predetermined threshold value (e.g., about several tens of centimeters to 1 meter), the estimation unit F240 may determine that the contract user is riding in the vehicle 10 during the trip. On the other hand, if the deviation of both travel paths is greater than the predetermined threshold value, the estimation unit F240 may determine that the contract user is not riding in the vehicle 10 during the trip.

If the vehicle 10 is equipped with a camera for taking pictures of the inside of the vehicle 10, the estimation unit F240 may determine whether the contract user is riding in the vehicle 10 during the trip by analyzing the images taken by the camera during the trip of the vehicle 10. Also, while the vehicle 10 is travelling, the telematics terminal 100 may be caused to poll the mobile terminal of the contract user using a short distance wireless communication of Bluetooth (registered trademark) LowEnergy standard, or the like, to determine whether the contract user is riding in the vehicle 10 during the trip.

<Third Modification>

In the embodiment described above, when the elapsed time from the date and time when the contract user information is last displayed to the date and time when the vehicle 10 is activated is equal to or longer than the first time length, it is determined that the predetermined condition is met. On the other hand, in this modification, an example in which it is determined that the predetermined condition is met when the vehicle 10 is activated after the remote controlling of the vehicle 10 is performed will be described.

The remote controlling of the vehicle 10 is a service available to the contract user of the telematics service. Such remote controlling is through an application program installed on the mobile terminal of the contract user. That is, the contract user may remotely control the vehicle 10, such as by remote controlling an air-conditioning system or a security system, through the mobile terminal application program prior to riding in the vehicle 10. For example, when an operation for turning ON the air-conditioning system of the vehicle 10 is performed by the mobile terminal executing the application program, a request for activating the air-conditioning system is transmitted from the mobile terminal to the server apparatus 200. The server apparatus 200 that received the above request authenticates the contract user. If the contract user is successfully authenticated, the server apparatus 200 transmits a remote command to the telematics terminal 100 in order to activate the air-conditioning system. Upon receiving the above remote command, the telematics terminal 100 activates the air-conditioning system of the vehicle 10 through an ECU for the air-conditioning system, etc. This allows the contract user to keep a temperature of a passenger compartment or the like at a desired temperature prior to riding in the vehicle 10.

(Functional Configuration of Server Apparatus)

FIG. 10 is a block diagram illustrating an example of the functional configuration of server apparatus 200 according to the present modification. The server apparatus 200 according to the present modification includes, as its functional components, a remote processing unit F250 in addition to the detecting unit F210, the determining unit F220, the instructing unit F230, and the contract management database D210. These functional components are achieved by the processor 201 of the server apparatus 200 executing a program stored in the auxiliary storage 203.

The remote processing unit F250 authenticates the contract user when it receives a request from the mobile terminal. The contract user is authenticated, for example, in a well-known manner. For example, the above authentication may be performed by comparing the user ID contained in the above the request with the user ID of the contract user associated with the telematics terminal 100. If the contract user is successfully authenticated, the remote processing unit F250 transmits a remote command corresponding to the request to the telematics terminal 100. For example, if the above request requires actuation of the air conditioning system, the remote processing unit F250 transmits a remote command for activating the air conditioning system to the telematics terminal 100. When the remote processing unit F250 finishes transmitting the remote command, the remote processing unit F250 turns ON the second flag. The second flag is turned ON when the vehicle 10 is remotely controlled and turned OFF when the displaying instruction is transmitted. The second flag is registered in the contract information table of the contract management database D210. That is, as shown in FIG. 11, the contract information table according to the present modification includes fields of the terminal ID, the contract user information, and a flag. The information registered in the terminal ID field and the contract user information field are the same as in the contract information table of the previous embodiment (see FIG. 4). As described above, the flag that is turned ON when the vehicle 10 is remotely controlled and that is turned OFF when the displaying instruction is transmitted is registered in the flag fields.

The determining unit F220 according to the present modification determines whether a predetermined condition is met based on the flag registered in the flag field of the contract information table. Specifically, the determining unit F220 accesses the contract management database D210 using terminal ID received from detecting unit F210 as an argument. The determining unit F220 identifies the contract information table of which the terminal ID field registers the information matching the above terminal ID. The determining unit F220 determines whether the flag registered in the flag field of the specified contract information table is ON. When the flag registered in the flag field is ON, the determining unit F220 determines that a predetermined condition is met. In this instance, the terminal ID passed from the detecting unit F210 to the determining unit F220 is passed from the determining unit F220 to the instructing unit F230. Then, the instructing unit F230 transmits the displaying instruction to the telematics terminal 100 through communication unit 204. When the instructing unit F230 finishes transmitting the displaying instruction, the instructing unit F230 turns OFF the flag registered in the flag field of the contract information table above. When the flag registered in the flag field is OFF, the determining unit F220 determines that the predetermined condition is not met. In this instance, the terminal ID passed from the detecting unit F210 to the determining unit F220 is not passed from the determining unit F220 to the instructing unit F230. Therefore, the displaying instruction is not transmitted from the instructing unit F230 to the telematics terminal 100.

According to this modification, the contract user information is displayed on the telematics terminal 100 when the vehicle 10 is activated after the vehicle 10 has been remotely controlled. At this time, by displaying the screen as shown in FIG. 6 on the input/output unit 104 of the telematics terminal 100, the occupant can be prompted to use the telematics service other than remote control.

<Fourth Modification>

In the embodiment described above, when the elapsed time from the date and time when the contract user information is last displayed to the date and time when the vehicle 10 is activated is equal to or longer than the first time length, it is determined that the predetermined condition is met. On the other hand, in the present modification, an example in which it is determined that the predetermined condition is met when the use frequency of the telematics service is low will be described.

If the elapsed time from the date and time when the telematics service was last used to the date and time when the vehicle 10 is activated is long, it can be estimated that the use frequency of the telematics service is low. In this case, it is necessary to encourage the use of telematics services. Therefore, in the present modification, if the elapsed time from the date and time when the telematics service was last used to the date and time when the vehicle 10 is activated is equal to or longer than the second time length, the determining unit F220 determines that the predetermined condition is met.

The functional configuration of server apparatus 200 according to the present modification is the same as that of the embodiment described above with reference to FIG. 3. However, as shown in FIG. 12, the contract information table in the present modification has fields of the terminal ID, the contract user information, and a use date and time. The information registered in the terminal ID field and the contract user information field are the same as in the contract information table of the previous embodiment (see FIG. 4). An information indicating the date and time when the telematics service was last used (corresponding to the "second date and time" in the present disclosure) is registered in the use date and time field. The information that is registered in the use date and time field is updated each time the telematics service is used.

The determining unit F220 according to the present modification determines whether or not the predetermined condition is met based on an information registered in the use date and time field of the contract information table. Specifically, the determining unit F220 accesses the contract management database D210 using the terminal ID received from detecting unit F210 as an argument. The determining unit F220 identifies the contract information table of which the terminal ID field registers the information matching the above terminal ID. The determining unit F220 reads the second date and time registered in the use date and time field of the specified contract information table. The determining unit F220 calculates an elapsed time from the second date and time to the present date and time (the date and time when the detecting unit F210 detects the activation of the vehicle 10). The determining unit F220 determines whether or not the calculated elapsed time is equal to or longer than a second time length. The second time length is a time length determined by the TSP, and is, for example, a time length of several weeks or a time length of several months. When the elapsed time is equal to or longer than the second time length, the determining unit F220 determines that the predetermined condition is met. In this instance, the terminal ID passed from the detecting unit F210 to the determining unit F220 is passed from the determining unit F220 to the instructing unit F230. When the elapsed time is less than the second time length, the determining unit F220 determines that the predetermined condition is not met. In this instance, the terminal ID passed from the detecting unit F210 to the determining unit F220 is not passed from the determining unit F220 to the instructing unit F230.

According to this modification, the contract user information is displayed in the telematics terminal 100 only when the frequency of use of the telematics service is low. As a result, it is possible to suppress the occupant from feeling troubled, and to encourage the occupant to use the telematics service.

<Others>

The above-described embodiment and modifications are merely examples, and the disclosed embodiment and modifications may be appropriately modified and practiced without departing from the gist thereof. In addition, the processing and the configuration described in the above-described embodiment and modifications can be freely combined and implemented so long as technical inconsistencies do not occur. Further, the processing described as being performed by one apparatus may be shared and executed by a plurality of apparatuses. For example, some of processes performed in the server apparatus 200 may be performed in the telematics terminal 100. Also, all of the processes performed in the server apparatus 200 may be performed in the telematics terminal 100. In the computer system, it is possible to flexibly change the hardware configuration of each function.

The present disclosure can also be implemented by supplying a computer program that implements the functions described in the above-described embodiment or modifications to a computer, and reading and executing the program by one or more processor(s) of the computer. Such a computer program may be provided to the computer by a non-transitory computer-readable storage medium connectable to a system bus of the computer, or may be provided to the computer via a network. The non-transitory computer-readable storage medium is a storage medium that can store information, such as data and programs, by electric, magnetic, optical, mechanical, or chemical action and read from the computer or the like. The non-transitory computer-readable storage medium may be any type of disk, such as, for example, a magnetic disk (floppy disk, HDD, etc.) or an optical disk (such as a CD-ROM, DVD disk, or Blu-ray Disc). Non-transitory computer-readable storage media may also be media such as ROM, RAM, EPROM, EEPROM, magnetic cards, flash memories, optical cards, or SSDs (Solid State Drive).

What is claimed is:

1. An information processing apparatus comprising:
    a controller including at least one processor, the controller being programmed to:
    transmit a first instruction to a telematics terminal mounted on a vehicle to cause an information about a first user who is associated with the vehicle to be displayed by the telematics terminal, in a case where a predetermined condition is met at a time of activation of the vehicle, the first user being a user who is subscribing to a telematics service provided through the telematics terminal, wherein
    the controller determines that the predetermined condition is met when trips by the vehicle are repeated a predetermined number of times in succession while the first user is not riding in the vehicle,
    the controller determining whether the vehicle took a trip while the first user is not riding in the vehicle by:
        during the trip of the vehicle, which is a period from when an activation switch of the vehicle is turned on by an occupant of the vehicle until the activation switch is turned off, receiving in real time a location of the telematics terminal detected by a sensor of the telematics terminal and a location of a mobile terminal carried by the first user detected by a sensor of the mobile terminal,
        determining a travel path of the telematics terminal and a travel path of the mobile terminal during the trip of the vehicle according to the location of the telematics terminal that has been received and according to the location of the mobile terminal that has been received,
        determining whether a deviation between the travel path of the telematics terminal that has been determined and the travel path of the mobile terminal that has been determined is greater than a predetermined threshold value, and
        determining that the first user is not riding in the vehicle when the deviation that has been determined is greater than the predetermined threshold value.

2. The information processing apparatus according to claim 1, wherein
    the information about the first user is part of an e-mail address of the first user.

3. An information processing method comprising the following step of processing executed by a computer:
    transmitting a first instruction to a telematics terminal mounted on a vehicle to cause an information about a first user who is associated with the vehicle to be displayed by the telematics terminal, in a case where a predetermined condition is met at a time of activation of the vehicle, the first user being a user who is subscribing to a telematics service provided through the telematics terminal, wherein
    the computer determines that the predetermined condition is met when trips by the vehicle are repeated a predetermined number of times in succession while the first user is not riding in the vehicle,
    the computer determining whether the vehicle took a trip while the first user is not riding in the vehicle by:
        during the trip of the vehicle, which is a period from when an activation switch of the vehicle is turned on by an occupant of the vehicle until the activation switch is turned off, receiving in real time a location of the telematics terminal detected by a sensor of the telematics terminal and a location of a mobile terminal carried by the first user detected by a sensor of the mobile terminal, determining a travel path of the telematics terminal and a travel path of the mobile terminal during the trip of the vehicle according to the location of the telematics terminal that has been received and according to the location of the mobile terminal that has been received, determining whether a deviation between the travel path of the telematics terminal that has been determined and the travel path of the mobile terminal that has been determined is greater than a predetermined threshold value, and determining that the first user is not riding in the vehicle when the deviation that has been determined is greater than the predetermined threshold value.

4. The information processing method according to claim 3, wherein the information about the first user is part of an e-mail address of the first user.

\* \* \* \* \*